United States Patent
Chen et al.

(10) Patent No.: US 8,419,954 B1
(45) Date of Patent: Apr. 16, 2013

(54) METHOD FOR PROVIDING A SIDE SHIELD FOR A MAGNETIC RECORDING TRANSDUCER

(75) Inventors: Yan Chen, Fremont, CA (US);
Donghong Li, Pleasanton, CA (US);
Lien-Chang Wang, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/285,267

(22) Filed: Oct. 31, 2011

(51) Int. Cl.
*B44C 1/22* (2006.01)

(52) U.S. Cl.
USPC .................................. 216/22; 29/603.16

(58) Field of Classification Search .............. 216/22; 29/603.16
See application file for complete search history.

(56) References Cited

U.S. PATENT DOCUMENTS

| | | | |
|---|---|---|---|
| 8,276,258 B1 * | 10/2012 | Tran et al. ................ | 29/603.16 |
| 2008/0151437 A1 | 6/2008 | Chen et al. | |
| 2008/0180861 A1 | 7/2008 | Maruyama et al. | |
| 2008/0278861 A1 | 11/2008 | Jiang et al. | |
| 2009/0154026 A1 | 6/2009 | Jiang et al. | |

* cited by examiner

*Primary Examiner* — Roberts Culbert

(57) ABSTRACT

A method for fabricating a side shield for a magnetic transducer is described. The transducer has a nonmagnetic layer, a pole, a gap layer between the pole sidewalls and the nonmagnetic layer, and a hard mask having a hard mask aperture. A removal mask having a removal aperture exposing part of the pole and hard mask aperture is provided. The removal mask covers part of the hard mask aperture and the part of the hard mask. A trench in the nonmagnetic layer is formed by removing part of the nonmagnetic layer. A seed layer is deposited. A deposition mask having a deposition aperture therein is provided. The deposition aperture exposes part of the trench and part of the nonmagnetic layer. Side shield material(s) are deposited. Part of the side shield material(s) external to the deposition trench are removed. A remaining portion of the side shield material forms the side shield.

15 Claims, 10 Drawing Sheets

METHOD FOR PROVIDING A SIDE SHIELD FOR A MAGNETIC RECORDING TRANSDUCER

BACKGROUND

FIG. 1 is a flow chart depicting a conventional method 10 for fabricating side shields for a conventional magnetic recording transducer. For simplicity, some steps are omitted. The conventional method 10 typically starts after a pole, such as a perpendicular magnetic recording (PMR) pole has been provided in a nonmagnetic layer, such as aluminum oxide. For example, a damascene process that forms a trench in the aluminum oxide layer, deposits nonmagnetic side gap/seed layers, and deposits magnetic pole layers may be used. In addition, the portion of the magnetic material external to the trench may be removed, for example using a chemical mechanical planarization (CMP) process. A wet etch mask is provided, via step 12. The wet etch mask exposes part of the nonmagnetic layer around the pole near the location at which the air-bearing surface (ABS location) is to be formed. The portion of the nonmagnetic layer exposed by the wet etch mask is also exposed by any other masks remaining from the pole formation process.

The exposed aluminum oxide is wet etched, via step 14. Thus, a trench is formed around a portion of the pole near the ABS location. Note that side gap layers may remain after the aluminum oxide etch in step 14. In some cases, a side gap layer (or an additional side gap layer) may be deposited after step 14. The seed layer for the side shield is deposited, via step 16. A mask for the side shield is deposited, via step 18 and the side shield deposited, via step 20. The mask used for depositing the side shield may also be removed in step 20. Further, the exposed portion of the side shield seed may also be removed. Aluminum oxide is deposited, via step 22. Thus, the trench formed by the wet etch is refilled. The transducer may then be planarized, via step 24. Formation of the transducer may then be completed.

FIG. 2 depicts plan and air-bearing surface (ABS) views of a portion of a conventional PMR transducer 50 formed using the conventional method 10. The conventional transducer 50 includes an underlayer 52, aluminum oxide layer 54 in which the pole is formed, Ru side gap layer 56 which is deposited in the trench (not shown) is also shown. The pole 58, seed layer 60, side shield 62, and aluminum oxide layer 64 are also shown. Thus, using the conventional method 10, the side shield 62 may be formed.

Although the conventional method 10 may provide the conventional transducer 50, there may be drawbacks. The performance of the conventional transducer 50 may be compromised. In particular, fabrication using the method 10 may result in magnetic material at unexpected and/or uncontrolled locations. For example, the magnetic transducer 50 may include magnetic inclusions 66. The inclusions may be present due to the removal of excess side shield material after step 20. In addition, undercuts 68 are shown. These undercuts may be formed due to the mask provided in step 18. The mask may have a BARC or other mask underlayer that is formed for mask formation. The mask underlayer that tends to be undercut. Thus, when the side shield materials are deposited, the undercut may be filled, forming inclusions 68. Thus, magnetic material may reside at locations 66 and 68, which are inadvertent and uncontrolled. In addition, parts (not shown) of the seed layer 60 that are far from the pole 58 may be difficult to remove. There may be some portion of the magnetic side shield material residing on these remaining parts of the transducer 10. Thus, additional unwanted magnetic material may remain at the ABS of the conventional magnetic transducer 50. Like the inclusions 66 and 68, this additional magnetic material is undesirable.

Accordingly, what is needed is an improved method for fabricating a transducer.

SUMMARY

A method for fabricating a side shield for a magnetic transducer is described. The magnetic transducer has a nonmagnetic layer, a pole, a gap layer, and a hard mask having a hard mask aperture therein. The pole has sidewalls and an air-bearing surface (ABS) location corresponding to an ABS. The gap layer is between the sidewalls of the pole and a portion of the nonmagnetic layer. A first portion of the hard mask resides on the pole. A second portion of the hard mask resides on a portion of nonmagnetic layer. The hard mask aperture resides between the first portion and the second portion of the hard mask. The method includes providing a removal mask having a removal aperture therein. The removal aperture exposes a portion of the pole proximate to the ABS location and a first portion of the aperture. The removal mask covers a second portion of the aperture in a track width direction from the ABS location of the pole and covers the second portion of the hard mask. A first portion of the nonmagnetic layer exposed by the removal aperture is removed, forming a side shield trench in the nonmagnetic layer. A seed layer for the side shield is deposited. A side shield deposition mask having a deposition aperture therein is provided. The deposition aperture exposes a first portion of the side shield trench and a portion of the nonmagnetic layer in the track width direction from the ABS location of the pole. The side shield deposition mask covers a second portion of the side shield trench. At least one side shield material is deposited. A portion of the side shield material resides in the deposition aperture. The transducer is planarized to remove a portion of the side shield material external to the side shield trench. A remaining portion of the side shield material forms the side shield.

DETAILED DESCRIPTION OF THE PREFERRED EMBODIMENTS

Figure 1:
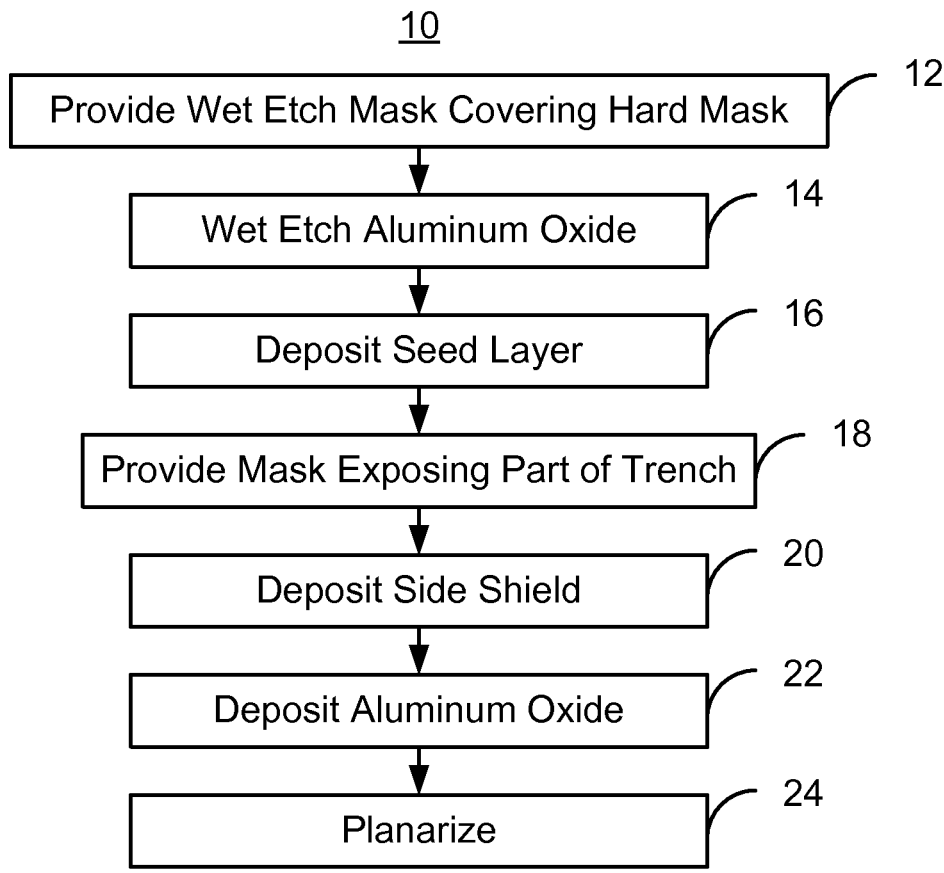
FIG. 1 is a flow chart depicting a conventional method for fabricating a side shield.
Figure 2:
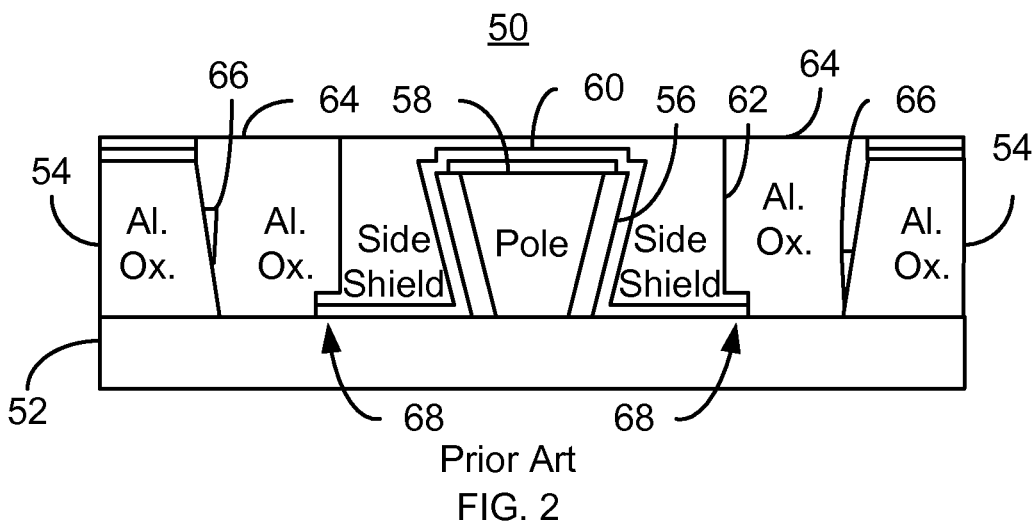
FIG. 2 is a diagram depicting an ABS view of a conventional magnetic transducer.
Figure 3:
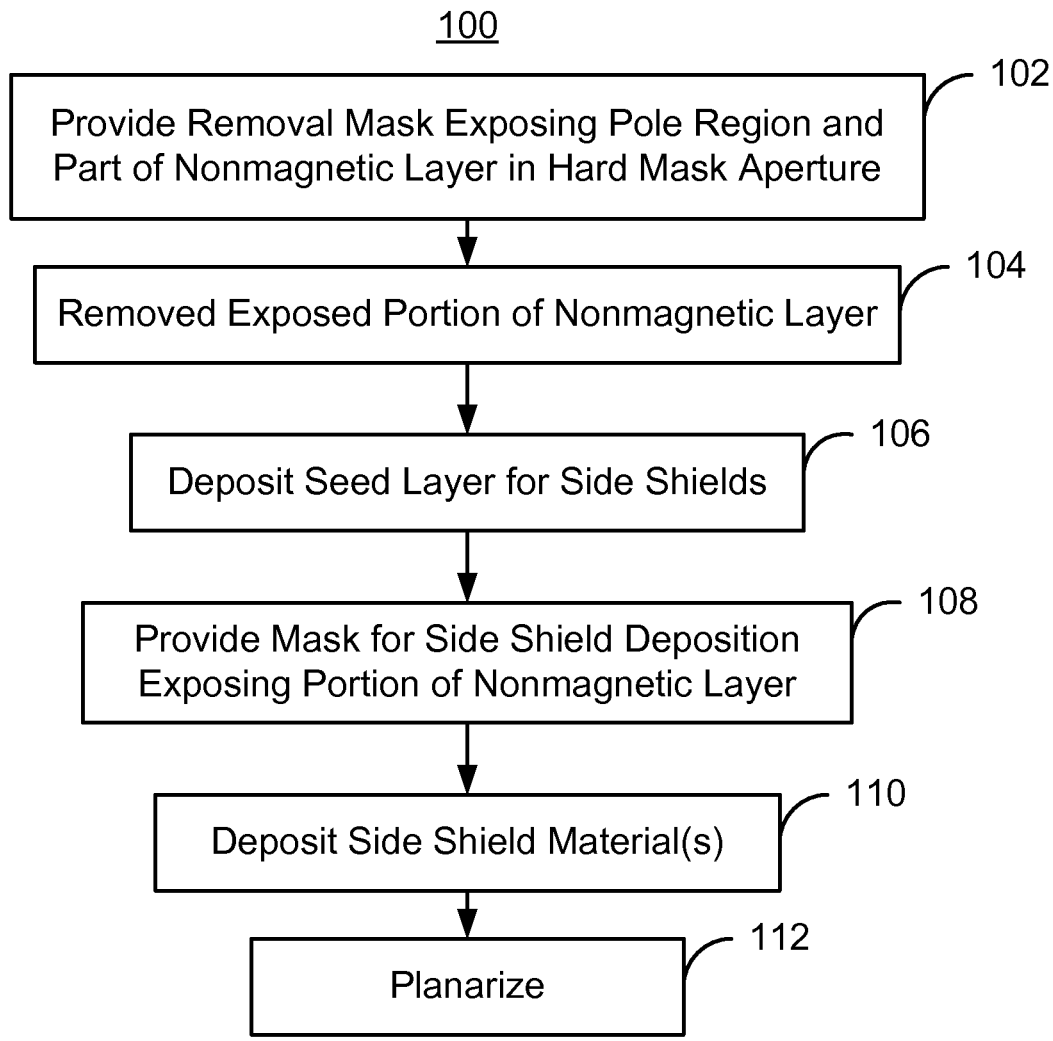
FIG. 3 is a flow chart depicting an exemplary embodiment of a method for fabricating side shield(s).

FIG. 3 is a flow chart depicting an exemplary embodiment of a method 100 for fabricating a transducer. The method 100 is may be used in fabricating transducers such as PMR or energy assisted magnetic recording (EAMR) transducers, though other transducers might be so fabricated. For simplicity, some steps may be omitted, performed in another order, and/or combined. The magnetic recording transducer being fabricated may be part of a merged head that also includes a read head (not shown) and resides on a slider (not shown) in a disk drive. The method 100 also may commence after formation of other portions of the PMR transducer. The method 100 is also described in the context of providing a single set of side shields and their associated structures in a single magnetic recording transducer. However, the method 100 may be used to fabricate multiple transducers at substantially the same time. The method 100 and system are also described in the context of particular layers. However, in some embodiments, such layers may include multiple sub-layers. In one embodiment, the method 100 commences after formation of the pole in a nonmagnetic intermediate layer. In some embodiments, the intermediate layer is an aluminum oxide layer. The nonmagnetic underlayer as well as the pole may reside on an underlayer. Further, in some embodiments, a leading edge shield is desired. In such embodiments, the leading edge shield may be provided under the underlayer. The leading edge shield is generally ferromagnetic, magnetically soft, and may include materials such as NiFe. In addition to the pole, a nonmagnetic gap layer may reside between the sidewalls of the pole and the nonmagnetic layer. In some embodiments, part of the nonmagnetic gap layer may also be under the pole. In some embodiments, a seed layer is also provided. The seed layer for the pole may be magnetic or nonmagnetic. Further, an air-bearing surface location (ABS location) marks the surface at which the air-bearing surface (ABS) will reside. As the pole has just been formed, a hard mask may still remain on the transducer. A portion of the hard mask covers the pole, while another portion of the hard mask covers part of the nonmagnetic layer. Aperture(s) in the hard mask (hard mask aperture(s)) are between these portions of the hard mask.

A removal mask having a removal aperture is provided, via step 102. In some embodiments, step 102 includes depositing a bottom antireflective coating (BARC) layer, providing a photoresist layer on the BARC layer, and patterning the photoresist to form the removal mask. In some embodiments, patterning the photoresist in step 102 results in an undercut in the BARC layer adjoining the removal aperture. In other embodiments, a BARC layer need not be used.

The removal aperture exposes a portion of the pole proximate to the ABS location. In some embodiments, this means that the removal aperture exposes the hard mask above the pole in the region of the ABS location. The removal aperture also exposes part of the hard mask aperture(s), but covers another portion of the hard mask aperture(s) in the track width direction. The covered portion of the hard mask aperture(s) is in a track width direction from the ABS location of the pole. The portion of the hard mask aperture(s) that is exposed by the removal aperture may adjoin the pole or gap layer. Thus, at the ABS, the removal aperture does not extend as far from the pole in the track width direction as do the hard mask aperture(s). The removal mask also covers at least part of the hard mask distal from the pole. A portion of the nonmagnetic layer is exposed by both the hard mask aperture and the removal aperture. Although there is overlap between the removal aperture of the removal mask and the hard mask aperture of the hard mask, the shape and location of the removal aperture differs from that of the hard mask aperture.

In addition to configuring the amount of the nonmagnetic layer exposed along in the track width direction of the pole at the ABS location, other aspects of the shape of the removal aperture may be tailored. For example, the removal aperture may have a back edge and a front edge. At least a portion of the back edge extends a depth from the ABS location in the stripe height direction. Part of the front edge of the removal aperture may be in a direction opposite to the stripe height direction from the ABS location. Part of the front edge may be on the same side of the ABS location as the back edge. Further, the removal aperture may have a canted region forming an angle with the ABS location. In some embodiments, this region is canted at an angle of at least fifteen and not more than twenty-five degrees. In some embodiments, this angle is twenty degrees.

A portion of the nonmagnetic layer exposed by the removal aperture is removed, via step 104. As discussed above, this is the portion of the nonmagnetic layer that is exposed by both the hard mask aperture and the removal aperture. In some embodiments, step 104 includes performing a wet etch appropriate to the nonmagnetic layer used. For example, an aluminum oxide wet etch may be used for an aluminum oxide nonmagnetic layer. One or more side shield trenches are formed in the nonmagnetic layer. Thus, at least part of the gap layer adjoining the sidewalls of the pole may remain after step 104 is completed. The side shield trenches extend from the gap layer in a track width direction along the ABS location. In some embodiments, the removal mask is removed after step 104 is completed.

A seed layer is deposited for the side shields, via step 106. In some embodiments, the seed layer is magnetic. In other embodiments, the seed layer is nonmagnetic.

A side shield deposition mask having a deposition aperture is provided, via step 108. In some embodiments, step 108 includes depositing a bottom antireflective coating (BARC) layer, providing a photoresist layer on the BARC layer, and patterning the photoresist to form the deposition mask. In some embodiments, patterning the photoresist in step 108 results in an undercut in the BARC layer adjoining the deposition aperture.

In some embodiments, the deposition aperture exposes part of the side shield trench. The side shield deposition mask covers another portion of the side shield trench. The deposition aperture may also expose part of the nonmagnetic layer in the track width direction from the ABS location of the pole. Stated differently, although there is overlap between the deposition aperture of the deposition mask and the removal aperture of the removal mask, the shape and location of the deposition aperture differs from that of the removal aperture. Similarly, although there is overlap between the deposition aperture of the deposition mask and the hard mask aperture of the hard mask, the shape and location of the deposition aperture differs from that of the hard mask aperture. In addition, other aspects of the deposition aperture may be configured. The deposition aperture may have a back edge extending from the ABS location in the stripe height direction to at least one throat height. The throat height(s) are less than the depth of the back edge of the removal aperture in the removal mask. Further, the front edge of the deposition mask may extend further from the ABS location in a direction opposite to the stripe height direction than the front edge of the removal aperture. Thus, the back edge of the side shields may be defined by the deposition mask, while the front edge of the side shields may be defined by the wet etch and removal mask. In other embodiments, the front edge of the deposition aperture may extend further from the ABS location in a direction opposite to the stripe height direction than the front edge of the removal mask aperture. Stated differently, the deposition aperture in the side shield deposition mask defines a throat height of the side shield in a stripe height direction perpendicular to the ABS, while the removal mask defines a canted angle of the side shield from the ABS.

At least one side shield material is deposited, via step 110. In some embodiments, step 110 includes plating the side shield material(s). Thus, a portion of the side shield material is in the deposition aperture. Part of the side shield material is also in part of the shield trench. In some embodiments, the deposition mask is removed after step 110 is completed. In addition, any extraneous side shield seed layer may be removed. An additional nonmagnetic layer may be deposited after the side shield material(s) and before step 112, described below.

A planarization step is performed to remove a portion of the side shield material external to the side shield trench, via step 112. A remaining portion of the side shield material(s) form the side shield. The side shield(s) may have a canted region at an angle from the ABS location due to the canted region of the removal mask. A portion of the front edge of the side shield(s) may correspond to the front edge of the removal aperture and, therefore, a wet etch performed in step 104. The back edge of the side shield(s) may correspond to the back edge of the deposition aperture of the deposition mask. Formation of the magnetic transducer may then be completed.

Figure 4:
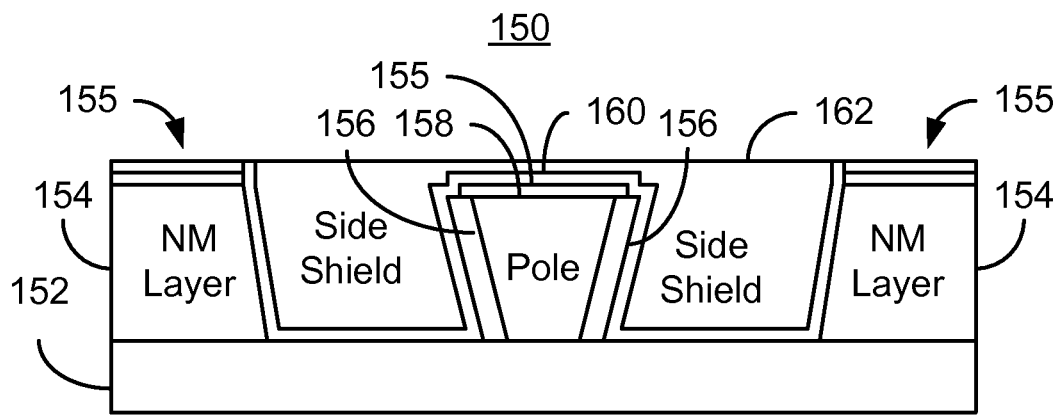
FIG. 4 is a diagram depicting an exemplary embodiment of a magnetic transducer having side shields.

FIG. 4 is a diagram depicting an exemplary embodiment of a portion of a magnetic transducer 150 having side shields that may be formed using the method 100. In particular, an ABS view is shown. For clarity, FIG. 4 is not to scale. The magnetic transducer 150 may be part of a merged heat that includes at least one read transducer (not shown) in addition to at least one magnetic transducer 150. The magnetic transducer 150 includes an underlayer 152, which may reside on a bottom shield (not shown). Also included are a nonmagnetic layer 154, hard mask 155, a gap layer 156, pole 158, seed layer 160, and side shield 162. The hard mask 155 may be used in formation of the pole 158. The pole 158 may be formed in the nonmagnetic layer 154. Portions of the nonmagnetic layer 154 adjoining the gap layer 156 may be removed in step 104, forming a trench in a portion of which the side shield 162 is formed. In the embodiment shown, the seed layer 160 is deposited in step 106, before a side shield deposition mask (not shown) is formed. However, in other embodiments, the side shield deposition mask may be formed in step 108 before the seed layer 160 is deposited in step 106. After fabrication of the side shield 162 is completed, other components including but not limited to coil(s), a write gap, and a top shield may be formed.

Using the method 100, side shield 162 having the desired geometry may be fabricated. The combination of the shape and location of the removal aperture and the shape and location of the deposition aperture allow for a reduction or elimination of extraneous magnetic material at the ABS. More specifically, the removal aperture, and thus the trench for the side shield formed in the nonmagnetic layer is smaller. Thus, there may be less seed layer remaining on portions of the transducer 150 from which it is desired to be removed. As a result, removal of unwanted portions of the seed layer 160 may be better accomplished. If desired, a canted region of the side shield 162 (not explicitly shown in FIG. 4) may be defined by the front edge of the removal aperture. The deposition aperture may reside on the hard mask 155 at the ABS location. Thus, any undercuts formed in the deposition mask also reside on the hard mask 155. As these undercuts are external to the trench formed for the side shields 162, any side shield material grown in the undercuts may be removed in the planarization step 112. Magnetic inclusions due to the undercut may thus be reduced or eliminated. Further, the back edge of the deposition aperture, and thus the back edge (not shown in FIG. 4) of the side shields 162 may be photolithographically defined. More specifically, the throat height of the side shields 162 may be better controlled. Thus, the fabrication of the side shield 162 may be enhanced and performance of the magnetic transducer 150 improved.

Figure 5:
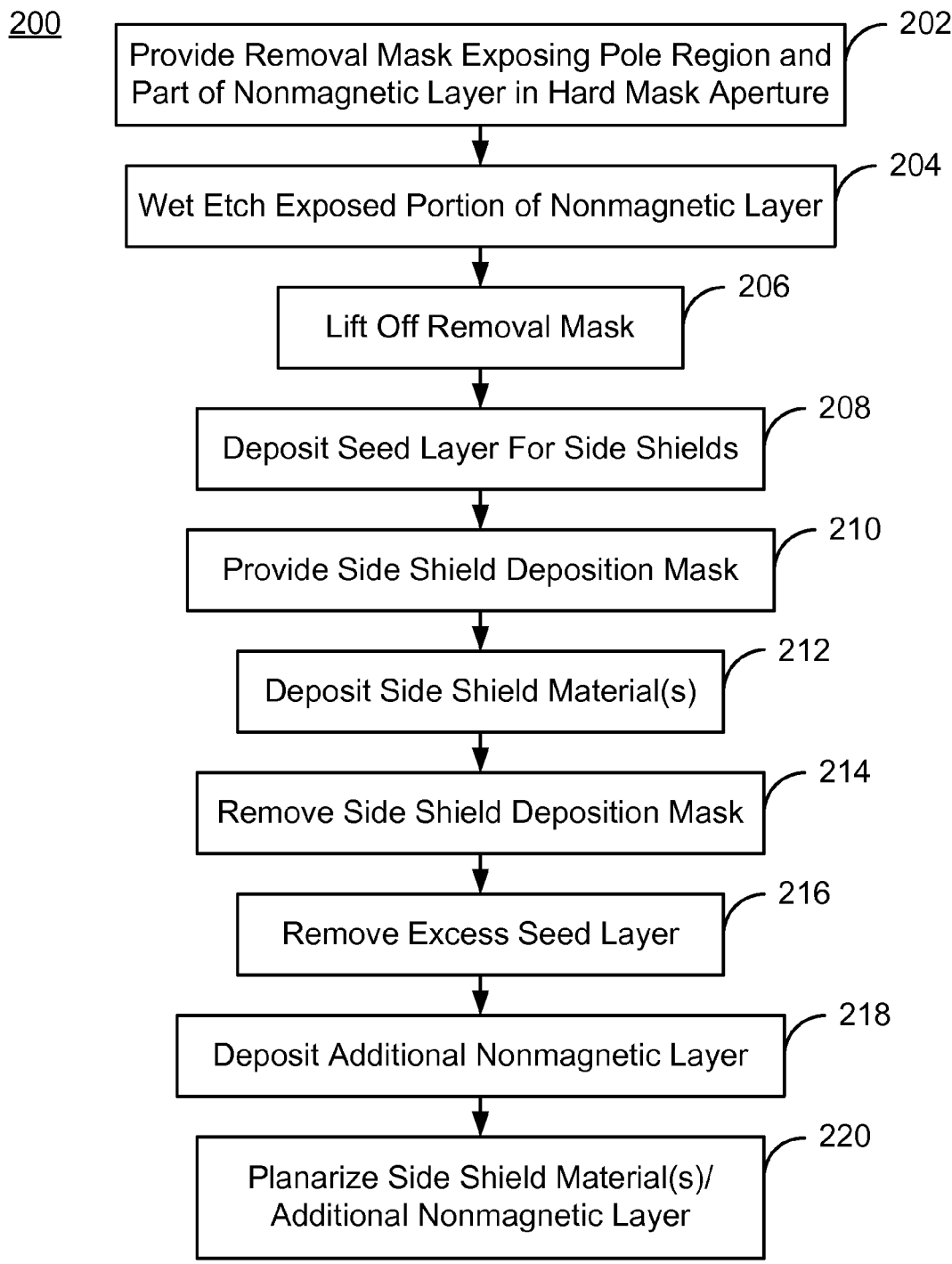
FIG. 5 is a flow chart depicting another exemplary embodiment of a method for fabricating side shields for a magnetic recording transducer.

FIG. 5 is a flow chart depicting another exemplary embodiment of a method 200 for fabricating a PMR transducer. For simplicity, some steps may be omitted. FIGS. 6-20 are diagrams depicting ABS location and plan views of an exemplary embodiment of a portion of a transducer during 250 fabrication. For clarity, FIGS. 6-20 are not to scale. Although FIGS. 6-20 depict the ABS location (location at which the ABS is to be formed) and ABS at a particular point in the pole, other embodiments may have other locations for the ABS. Referring to FIGS. 5-20, the method 200 is described in the context of the transducer 250. However, the method 200 may be used to form another device (not shown). The transducer 250 being fabricated may be part of a merged head that also includes a read head (not shown in FIGS. 6-20) and resides on a slider (not shown) in a disk drive. The method 200 also may commence after formation of other portions of the transducer 250. The method 200 is also described in the context of providing a single transducer 250. However, the method 200 may be used to fabricate multiple transducers at substantially the same time. The method 200 and device 250 are also described in the context of particular layers. However, in some embodiments, such layers may include multiple sublayers.

Figure 6:
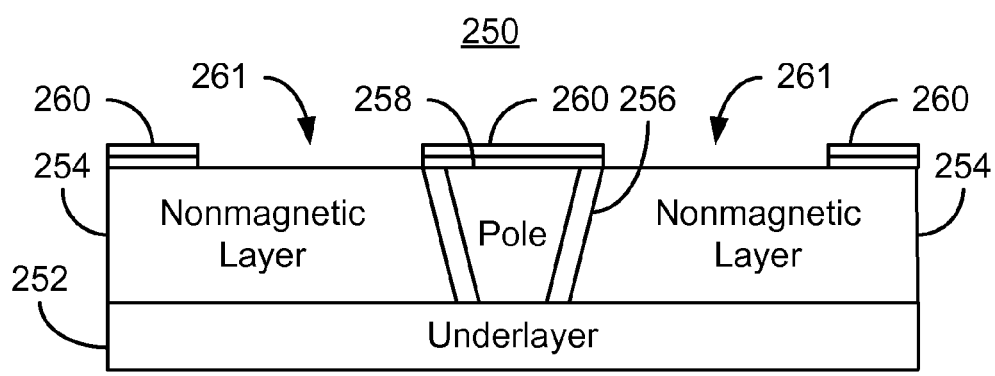
FIGS. 6-21 are diagrams depicting an exemplary embodiment of a magnetic recording transducer during fabrication.
Figure 7:
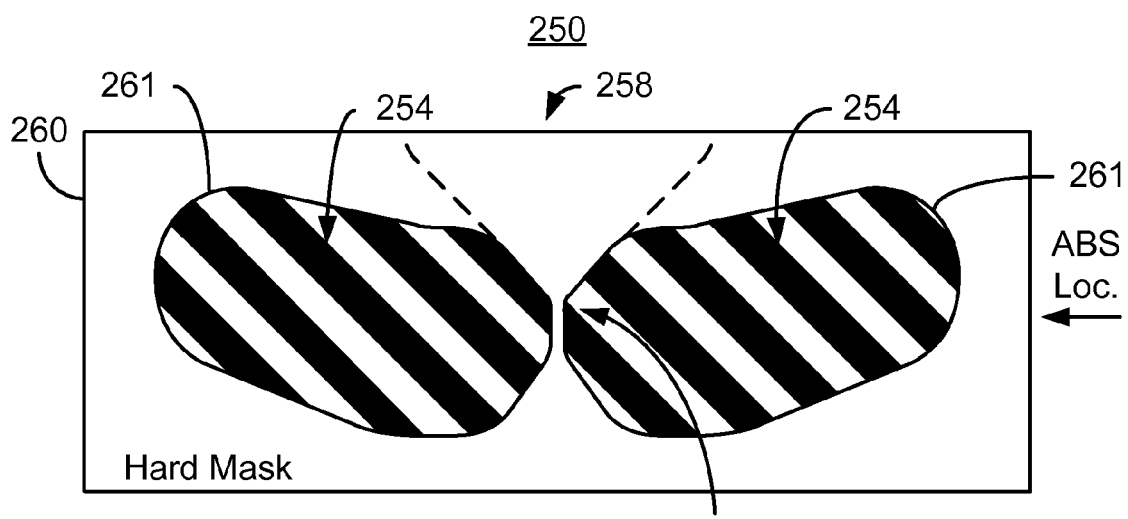

FIGS. 6-7 depict ABS location and plan views, respectively, of the transducer 250 before the step 202 of the method 200 is performed. The ABS location is also indicated in the plan view shown in FIG. 7. Thus, the transducer 250 includes an underlayer 252, which may be nonmagnetic and may reside on a leading edge shield. Also shown is a nonmagnetic layer 254 that may be aluminum oxide. The pole 258 has been formed in the nonmagnetic layer 254. In the embodiment shown, nonmagnetic gap layer 256 separates the pole 258 from the nonmagnetic layer 254. In some embodiments, the gap layer 256 includes Ru. In some embodiments, the gap layer 256 may also reside under the pole 258. In the plan view of FIG. 7, the yoke portion of the pole 258 is indicated by a dashed line, while the pole tip is located near the ABS location. A hard mask 260 having hard mask apertures 261 is also shown. The hard mask 260 is used in fabricating the pole 258. As can be seen in FIG. 7, the hard mask apertures 261 expose a portion of the nonmagnetic layer 254. This portion is cross-hatched in FIG. 7.

Figure 8:
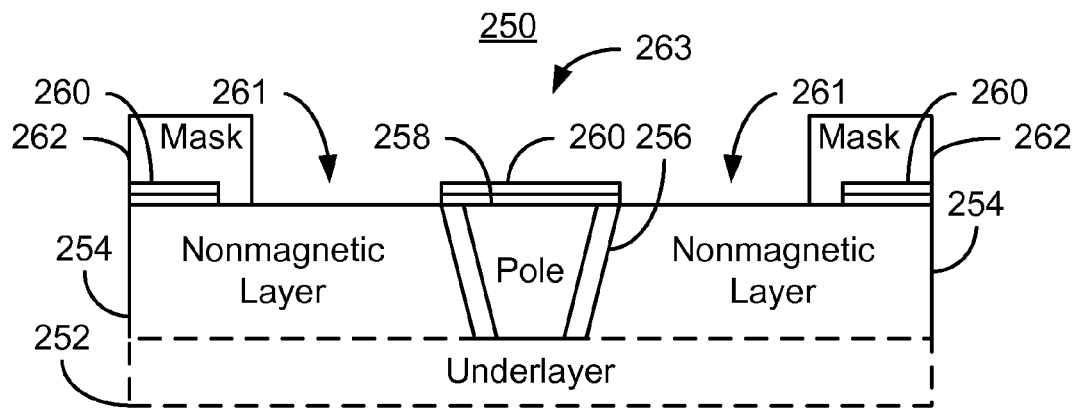
Figure 9:
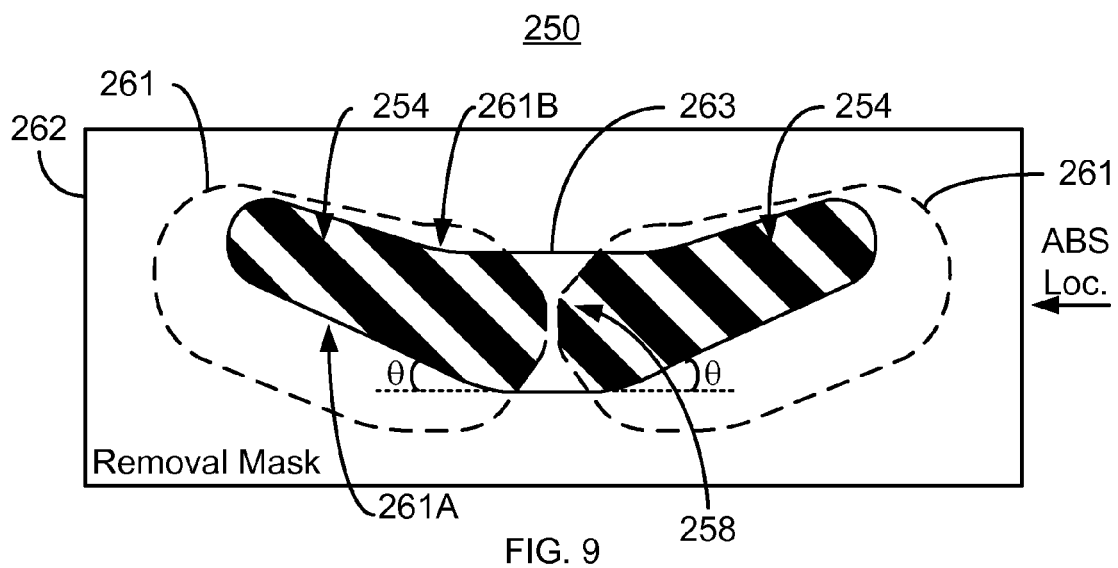

A removal mask having a removal aperture is provided, via step 202. Step 202 corresponds to step 102 in the method 100. In some embodiments, a photoresist layer may be deposited and patterned in step 202. In some such embodiments, an adhesion layer may also be used under the photoresist as part of the mask. Currently, such embodiments are preferred. In alternate embodiments, a BARC layer might also be used. FIGS. 8-9 depict the ABS location and plan views, respectively, of the transducer 250 after step 202 is performed. For clarity, the portions of the pole 258 under the hard mask 250 are no longer indicated in the plan view of FIG. 9. Instead, the hard mask aperture 261 under the removal mask 262 is shown by a dashed line.

A removal mask 262 having removal aperture 263 provided in step 202 is also shown. In the embodiment shown, a BARC layer is not used. As can be seen in FIGS. 8 and 9, the removal aperture 263 exposes a portion of the pole 258 around the ABS location. In the embodiment shown, the removal aperture exposes the portion of the hard mask 260 above the pole 258. The removal aperture also exposes part of the hard mask apertures 261, but covers another portion of the hard mask apertures in the track width direction (left to right in FIGS. 8-9). Thus, at the ABS, the removal aperture 263 does not extend as far from the pole 258 in the track width direction as do the hard mask apertures 261. In the region in which the removal aperture 263 and the hard mask aperture 261 overlap, the nonmagnetic layer 254 is exposed. This portion of the nonmagnetic layer 254 is cross-hatched in FIG. 9. As can also be seen in FIG. 9, the removal aperture 261 has a front edge 261A and a back edge 261B. The back edge 261B is in the stripe height direction from the ABS location (toward the top of FIG. 9). A portion of the front edge 261A extends in the opposite direction (down in FIG. 9) from the ABS location. Further, the removal aperture 261 has canted regions forming an angle, θ, with the ABS location (e.g. with a surface parallel to the ABS location. In some embodiments, the angle, θ, of at least fifteen and not more than twenty-five degrees. In some embodiments, θ is twenty degrees. For clarity, the angle θ is only indicated in FIG. 9.

Figure 10:
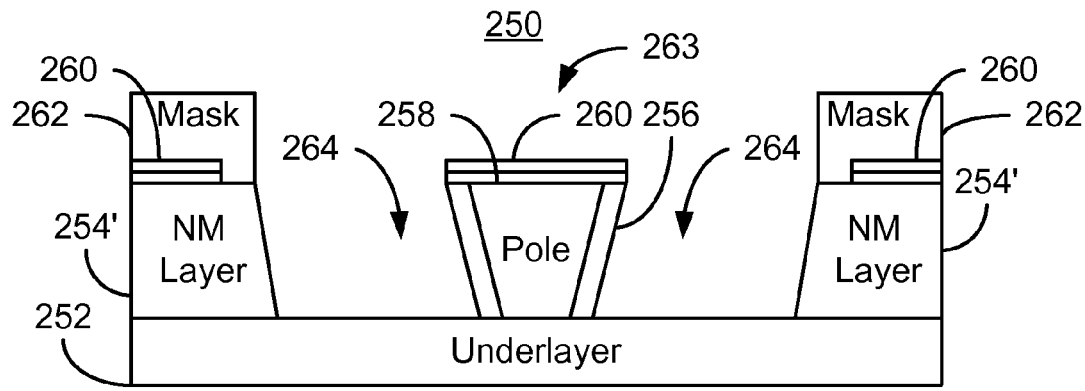
Figure 11:
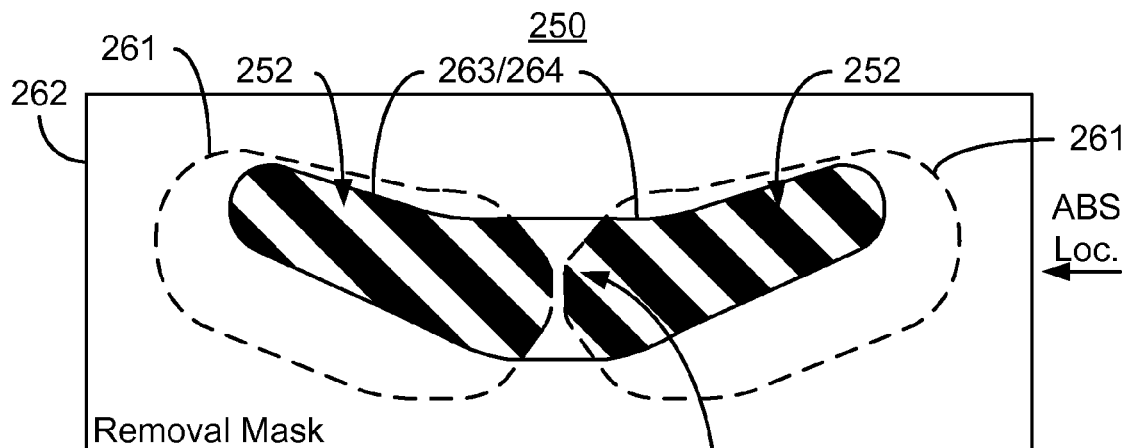

The exposed portion of the nonmagnetic layer 254 is wet etched, via step 204. Step 204 may include performing an alumina wet etch. FIGS. 10-11 depict ABS location and plan views, respectively, of the transducer 250 after step 204 is performed. At least part of the gap layer 256 remains after step 204 is completed. However, side shield trenches 264 have been formed in the nonmagnetic layer 254'. The side shield trenches 264 exposed the underlying layer 252. Thus, the cross-hatched region in FIG. 11 now corresponds to the underlayer 252. The removal mask is lifted off after step 204 is completed, via step 206.

Figure 12:
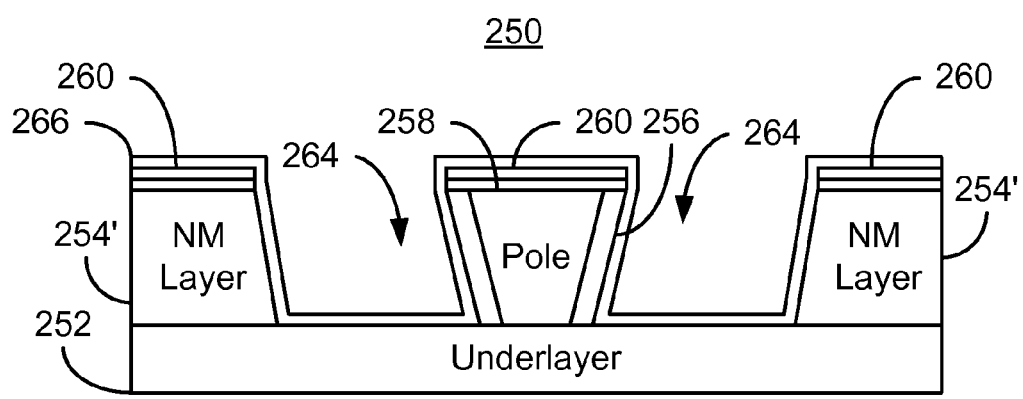

A seed layer is deposited for the side shields, via step 208. In some embodiments, the seed layer is magnetic. In other embodiments, the seed layer is nonmagnetic. Also, in the embodiment shown, the seed layer is deposited before the side shield deposition mask, discussed below, is formed. However, in other embodiments, the side shield deposition mask may be provided first. FIG. 12 depicts and ABS location view of the transducer 250 after step 208 is performed. Thus, the seed layer 266 is shown.

Figure 13:
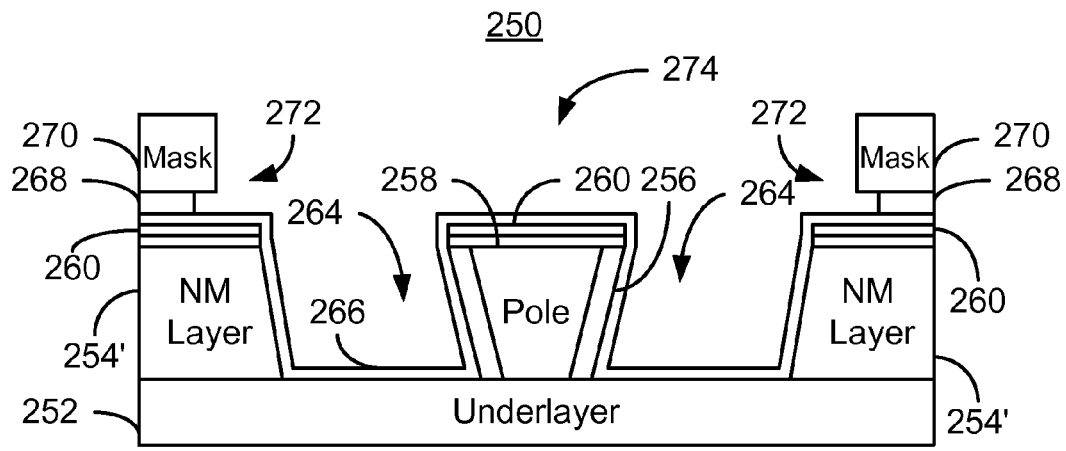
Figure 14:
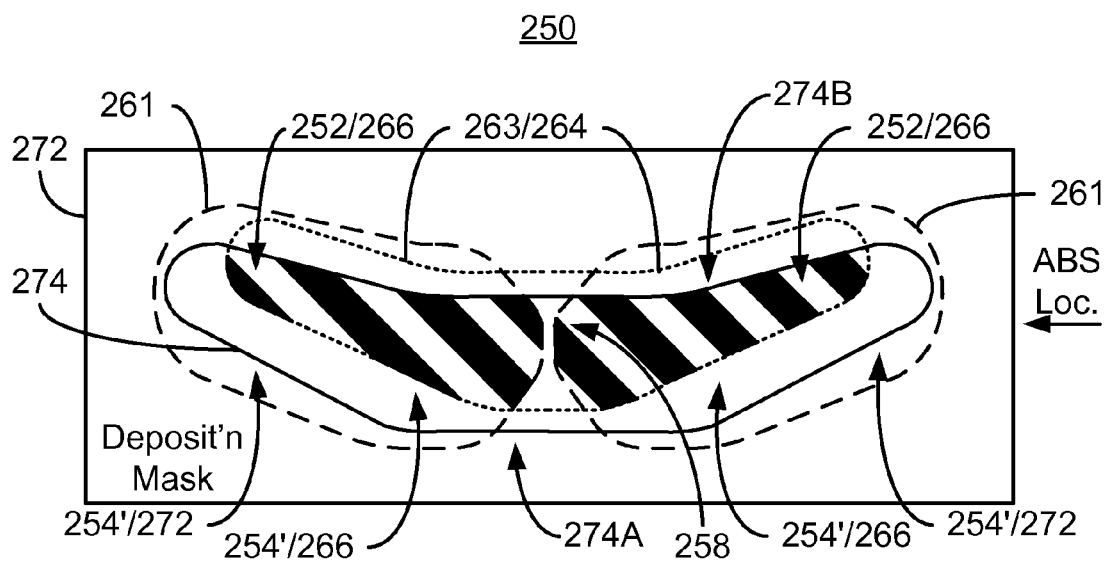

A side shield deposition mask is provided, via step 210. In some embodiments, step 210 includes depositing a BAR) layer, providing a photoresist layer on the BARC layer, and patterning the photoresist to form the deposition mask. The side shield deposition mask includes a deposition aperture corresponding to the desired location of the side shields. FIGS. 13-14 depict ABS and plan views of the transducer 250 after step 210 is performed. Thus, a side shield deposition mask 272 is provided. In the embodiment shown, the deposition mask 272 includes a BARC layer 268 and a photoresist layer 270. A deposition aperture 274 for the side shields has been formed in the side shield deposition mask. Thus, as can be seen in FIG. 13, the mask 272 has an undercut at the edges of the aperture 274.

In the plan view of FIG. 14, the location of the removal aperture 263 and side shield trenches 264 of the removal mask (which has been removed) is indicated by a dotted line. The location of the hard mask aperture 261 is indicated by the dashed line in FIG. 14. The aperture 274 in the deposition mask 272 is indicated by a solid line. As can be seen in the plan view of FIG. 14, there is some overlap between the removal aperture 263/side shield trenches 264 and the deposition aperture 274. This overlap is the region in side shields will reside and is cross-hatched. The side shield deposition mask 272 covers another portion of the removal aperture 263/side shield trenches 264. In the regions where the deposition aperture 274 and the removal aperture 263/side shield trenches 264 do not overlap, the deposition aperture 274 exposes part of the nonmagnetic layer 254'. Also exposed is the seed layer 266 on the nonmagnetic layer 254'. Thus, these regions are indicated by arrows 254'/266. Further, the deposition aperture 274 may cover portions of the nonmagnetic layer 254' exposed by the hard mask aperture 261 but which were covered by the removal mask (not shown in FIG. 14. Such regions are indicated by arrows 254'/272. Further, in the embodiment shown, the deposition aperture 274 includes front edge 274A and back edge 274B. As can be seen in FIG. 14, the back edge 274B is closer to the ABS than the back edge of the removal aperture 263. Thus, the back edge of the side shields, otherwise known as the throat height of the side shields, will be defined by the back edge 274B of the deposition aperture. In contrast, the front edge 274A of the deposition aperture 274 is further from the ABS location than the front edge of the removal aperture 263 and, therefore, the front edge of the side shield trenches 264. Thus, the front edge of the side shields, including the canted region, will be defined by the removal aperture 263/side shield trenches 264. Thus, as can be seen in FIG. 14, there is some overlap between the apertures 261, 263, and 274. However, the shapes and locations of the apertures 261, 263, and 264 differ.

Figure 15:
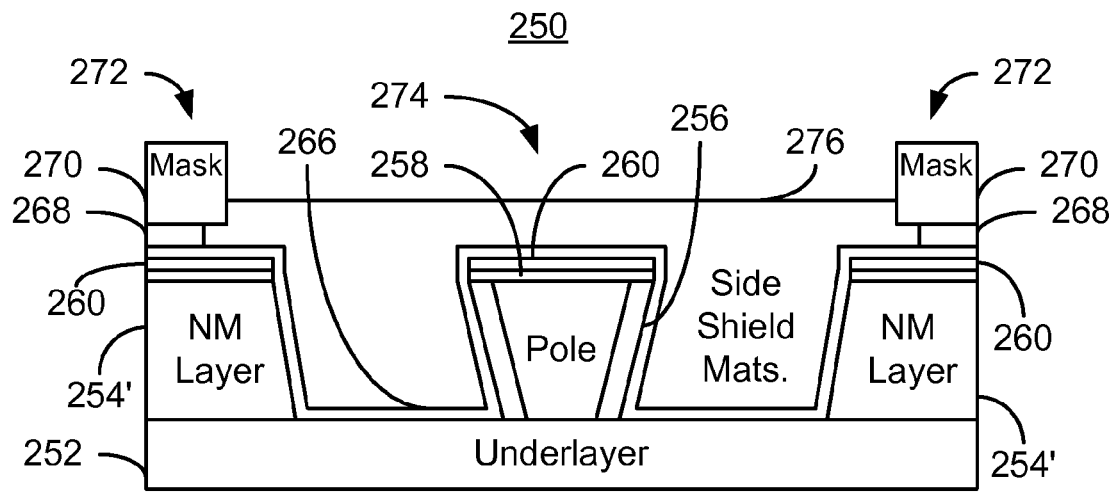
Figure 16:
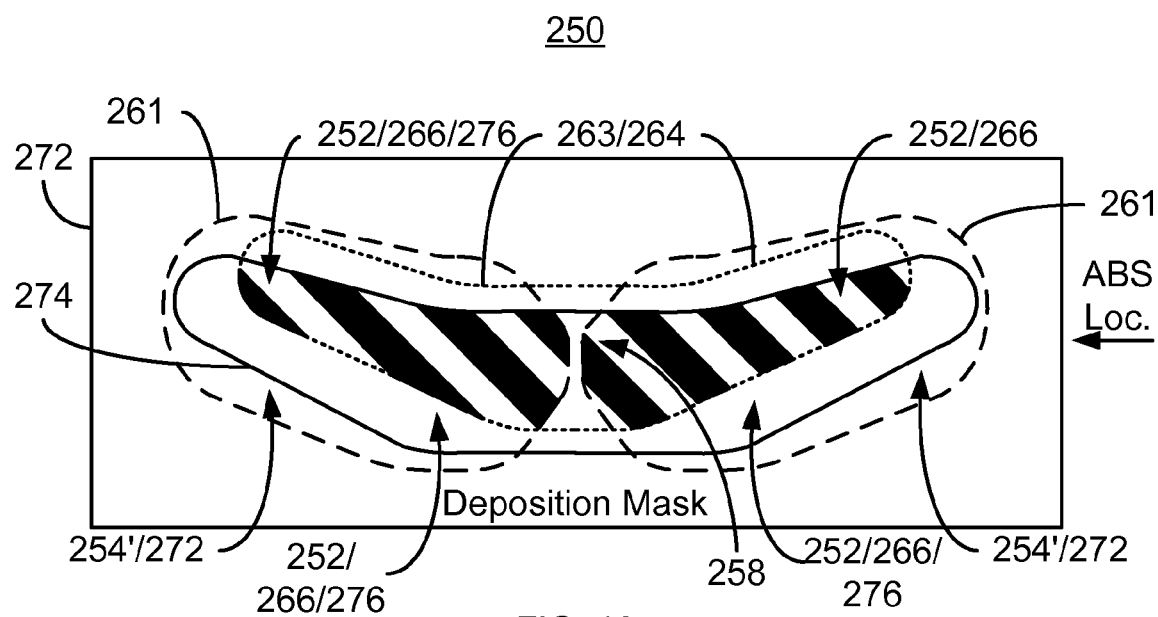

The material(s) for the side shield are deposited, via step 212. In some embodiments, step 212 includes plating the side shield material(s), such as NiFe. FIGS. 15-16 depict the transducer 250 after step 212 is performed. Thus, the side shield material 276 is shown. For clarity, the side shield material 276 is shown only in the deposition aperture 274 of the deposition mask 272. No side shield material is shown on top of the deposition mask 272. Note that part of the side shield materials fill the undercut in the mask 272. Part of the side shield material 276 is also in part of the shield trenches 264. More specifically, the side shield material 276 is shown as cross-hatched in the regions that the deposition aperture 274 overlaps with the side shield trenches 264. The side shields are formed from the side shield materials in this region.

Figure 17:
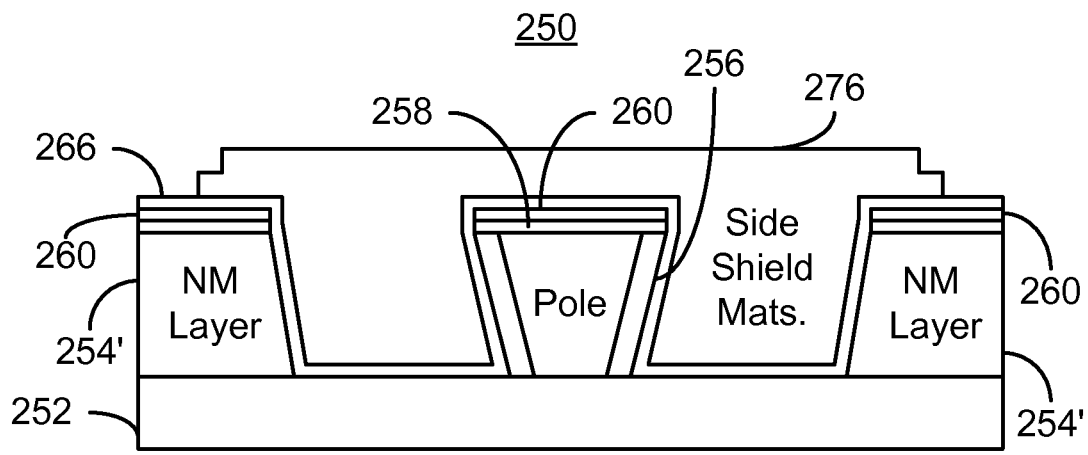

The side shield deposition mask is removed after deposition of the side shield materials 276, via step 214. In some embodiments, this is performed via a lift-off process. FIG. 17 depicts an ABS location view of the transducer 250 after step 214 is performed. Thus, the mask 272 has been removed. Note that the side shield material 276 is notched at its edges, in locations corresponding to the undercut in the deposition mask.

Figure 18:
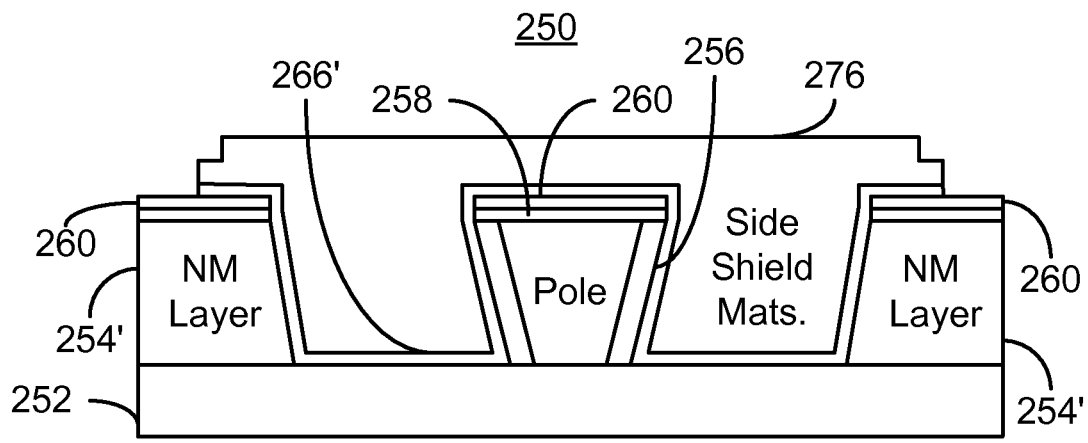
Figure 19:
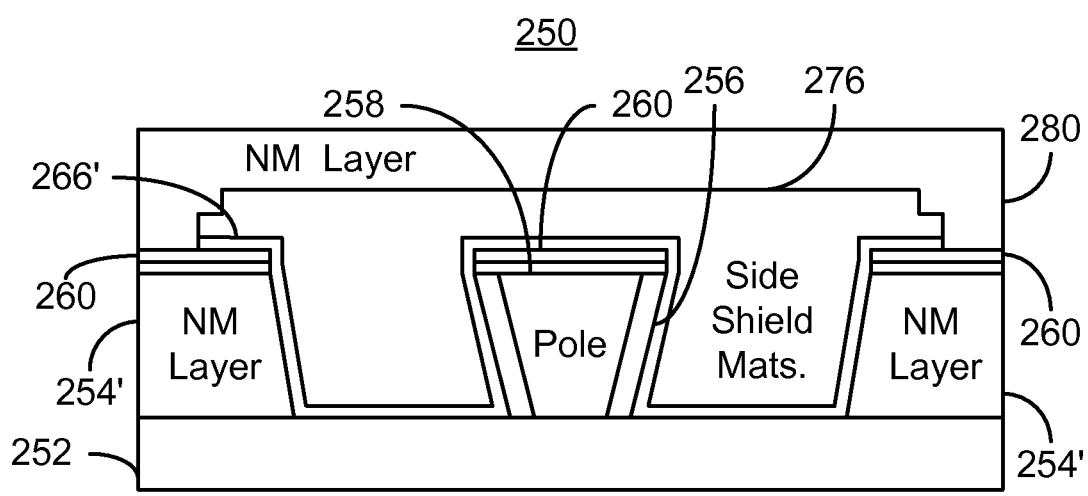

Any excess seed layer 266 is removed, via step 216. This may be performed by an ion milling step. FIG. 18 depicts the transducer 250 after step 216 is performed. Thus, a portion of the seed layer 266' remaining is shown. The seed layer 266' that was exposed by the side shield materials 276 has been removed. An additional nonmagnetic layer is deposited, via step 218. The additional nonmagnetic layer may be aluminum oxide. However in other embodiments, other and/or additional materials may be used. FIG. 19 depicts an ABS location view of the transducer 250 after step 218 has been performed. Thus, the additional nonmagnetic layer 280 is shown.

Figure 20:
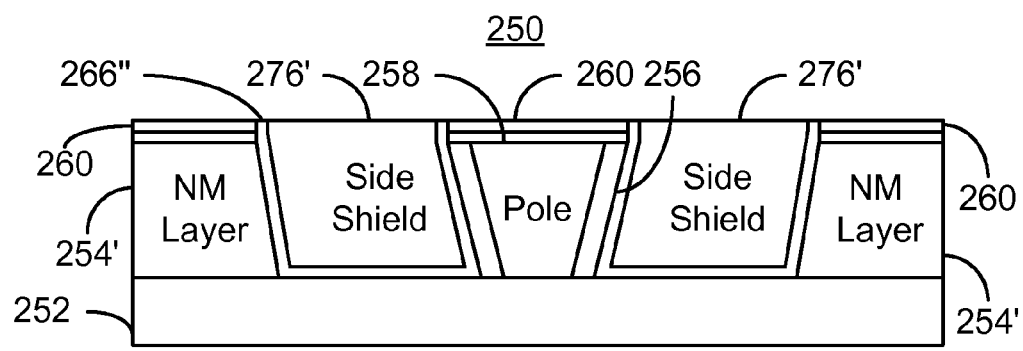
Figure 21:
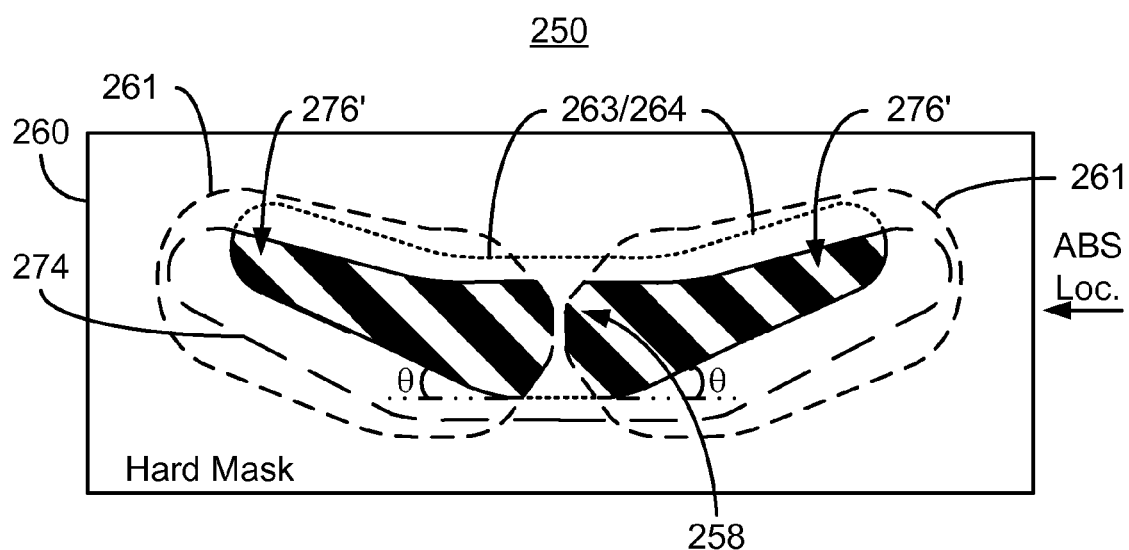

A planarization step is performed to remove a portion of the side shield material external to the side shield trench, via step 220. For example, a CMP may be used. FIGS. 20-21 depict ABS location and plan views, respectively. Portions of the side shield materials 276 and seed layer external to the side shield trenches 264 have been removed. Thus, side shields 276' and seed layer 266" remain. The removal aperture 263 and side shield trenches 264 are shown by a dotted line. The hard mask aperture 261 and deposition aperture are shown by dashed lines of different length. As can be seen in the plan view, the side shields 276' correspond to the overlap between the hard mask aperture 261, the removal aperture 263/side shield trenches 264, and the deposition aperture 276. The side shields 276' are shown as cross hatched in FIG. 20. The side shields 276 have a canted region at an angle, θ, from the ABS location due to the canted region of the removal mask. A portion of the front edge of the side shields 276 corresponds to the front edge of the removal aperture 263 and, therefore, the wet etch performed in step 204. The back edge of the side shields 276 corresponds to the back edge of the deposition aperture 276 of the deposition mask 272. Formation of the magnetic transducer 250 may then be completed.

Thus, using the method 200, the transducer 250 may be fabricated. The transducer 250 may share the benefits of the transducer 150. The side shields 276' have a back edge defined by the deposition mask 272 and a front edge defined by the removal mask. The throat height of the side shields 276' may be better controlled. The side shields 276' also have canted regions at an angle θ from the ABS location. The combination of the shape and location of the removal aperture 263 and the shape and location of the deposition aperture 274 allow for a reduction or elimination of extraneous magnetic material at the ABS. For example, any magnetic material corresponding to undercuts in the deposition mask 272 are removed by the planarization of step 220. Magnetic inclusions due to the undercut may thus be reduced or eliminated. Thus, the fabrication of the side shield 276' may be enhanced and performance of the magnetic transducer 250 improved.

We claim:

1. A method for fabricating a side shield for a magnetic transducer having a nonmagnetic layer, a pole, a gap layer, and a hard mask having a hard mask aperture therein, the pole having sidewalls and an air-bearing surface location (ABS location) corresponding to an air-bearing surface (ABS), the pole, the gap layer residing between the sidewalls of the pole and a portion of the nonmagnetic layer, a first portion of the hard mask residing on the pole, a second portion of the hard mask residing on a portion of nonmagnetic layer, the hard mask aperture residing between the first portion and the second portion of the hard mask, the method comprising:
   providing a removal mask having a removal aperture therein, the removal aperture exposing a portion of the pole proximate to the ABS location and a first portion of the aperture, the removal mask covering a second portion of the aperture in a track width direction from the ABS location of the pole and covering the second portion of the hard mask;
   removing a first portion of the nonmagnetic layer exposed by the removal aperture, forming a side shield trench in the nonmagnetic layer;
   depositing a seed layer for the side shield;
   providing a side shield deposition mask having a deposition aperture therein, the deposition aperture exposing a first portion of the side shield trench and a portion of the nonmagnetic layer in the track width direction from the ABS location of the pole, the side shield deposition mask covering a second portion of the side shield trench;
   depositing at least one side shield material, a portion of the side shield material residing in the deposition aperture;
   planarizing the transducer to remove a portion of the side shield material external to the side shield trench, a remaining portion of the side shield material forming the side shield.

2. The method of claim 1 wherein the removal aperture of the removal mask has a back edge extending at least one depth in a stripe height direction perpendicular to the ABS and wherein step of providing the side shield deposition mask further includes:
   providing the side shield deposition mask including the deposition aperture having a depositing aperture back edge extending from the ABS in the stripe height direction at least one throat height that is less than the at least one depth.

3. The method of claim 2 further comprising:
   removing the deposition mask before the step of planarizing the transducer.

4. The method of claim 1 wherein the step of providing the removal mask further includes:
   providing the removal mask having the removal aperture, the removal aperture including a canted region being canted at an angle from the ABS, the side shield having a side shield canted region corresponding to the canted region of the removal mask.

5. The method of claim 4 further comprising:
   removing the removal mask before the step of depositing the seed layer.

6. The method of claim 1 wherein the step of removing the first portion of the nonmagnetic layer further includes:
   wet etching the nonmagnetic layer.

7. The method of claim 1 further comprising:
   depositing an additional nonmagnetic layer after the step of depositing the at least one side shield material and before the step of planarizing the transducer.

8. The method of claim 1 wherein the step of providing the removal mask further includes:
   depositing a bottom antireflective coating layer;
   providing a photoresist layer on the bottom antireflective coating layer;
   patterning the photoresist layer to form the removal mask having the removal aperture therein, a portion of the bottom antireflective coating layer forming an undercut for the removal mask adjoining the removal aperture.

9. The method of claim 1 wherein the step of providing the side shield deposition mask further includes:
   depositing a bottom antireflective coating layer;
   providing a photoresist layer on the bottom antireflective coating layer;
   patterning the photoresist layer to form the side shield deposition mask having the deposition aperture therein, a portion of the bottom antireflective coating layer forming an undercut for the deposition mask adjoining the deposition aperture.

10. The method of claim 1 wherein the side shield deposition mask defines a throat height of the side shield in a stripe height direction perpendicular to the ABS and wherein the removal mask defines a canted angle of the side shield from the ABS.

11. The method of claim 10 wherein the deposition aperture has a front edge extending at least one deposition mask distance in a direction opposite to the stripe height direction and wherein the removal aperture has a removal aperture front edge extending at least one distance in the direction opposite to the stripe height direction, the at least one deposition mask distance being less than the at least one distance.

12. The method of claim 10 wherein the deposition aperture has a back edge extending at least one throat height distance in the stripe height direction and wherein the removal mask extends at least one removal mask distance in the stripe height direction, the at least one throat height distance being less than the removal mask distance.

13. A method for fabricating a side shield for a magnetic transducer having a nonmagnetic layer, a pole, a gap layer, and a hard mask having a hard mask aperture therein, the pole having sidewalls and an air-bearing surface location (ABS location) corresponding to an air-bearing surface (ABS), the gap layer residing between the sidewalls of the pole and a portion of the nonmagnetic layer, a first portion of the hard mask residing on the pole, a second portion of the hard mask residing on a portion of nonmagnetic layer, the hard mask aperture residing between the first portion and the second portion of the hard mask, the method comprising the sequential steps of:

provoking a removal mask having a removal aperture therein, the removal aperture exposing a portion of the pole proximate to the ABS location and a first portion of the aperture, the removal mask covering a second portion of the aperture in a track width direction from the ABS location of the pole and covering the second portion of the hard mask, the removal aperture having a back edge and a front edge, the front edge of the removal aperture forming a canted region having an angle canted from the ABS;

wet etching a first portion of the nonmagnetic layer exposed by the removal aperture, forming a side shield trench in the nonmagnetic layer, the side shield trench including a canted trench region corresponding to the canted region of the removal mask;

removing the removal mask;

depositing a seed layer for the side shield;

providing a side shield deposition mask having a deposition aperture therein, the deposition aperture exposing a portion of the side shield trench and a portion of the nonmagnetic layer in the track width direction from the ABS location of the pole, the deposition aperture having a deposition aperture front edge and a deposition aperture back edge, at least a portion of the deposition aperture front edge being further from the ABS than the front edge of the removal mask, at least a portion of the deposition aperture back edge being closer to the ABS than the back edge of the removal aperture, the deposition aperture back edge of the deposition mask defining a side shield throat height;

depositing at least one side shield material, a portion of the side shield material residing in the deposition aperture;

removing the side shield deposition mask;

depositing an additional nonmagnetic layer; and planarizing the transducer to remove a portion of the side shield material external to the side shield trench, a remaining portion of the side shield material forming the side shield having a canted region defined by the removal mask and a throat height defined by the side shield deposition mask.

14. The method of claim 13 wherein the step of providing the removal mask further includes:

depositing a bottom antireflective coating layer;

providing a photoresist layer on the bottom antireflective coating layer;

patterning the photoresist layer to form the removal mask having the removal aperture therein, a portion of the bottom antireflective coating layer forming an undercut for the removal mask adjoining the removal aperture.

15. The method of claim 13 wherein the step of providing the side shield deposition mask further includes:

depositing a bottom antireflective coating layer;

providing a photoresist layer on the bottom antireflective coating layer;

patterning the photoresist layer to form the side shield deposition mask having the deposition aperture therein, a portion of the bottom antireflective coating layer forming an undercut for the deposition mask adjoining the deposition aperture.

* * * * *